United States Patent
Anastas et al.

(10) Patent No.: US 8,502,792 B2
(45) Date of Patent: *Aug. 6, 2013

(54) METHOD AND APPARATUS FOR PROVIDING HAPTIC EFFECTS TO A TOUCH PANEL USING MAGNETIC DEVICES

(75) Inventors: George V. Anastas, San Carlos, CA (US); Neil T. Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/938,058

(22) Filed: Nov. 2, 2010

(65) Prior Publication Data

US 2011/0043474 A1     Feb. 24, 2011

Related U.S. Application Data

(63) Continuation of application No. 11/128,717, filed on May 12, 2005, now Pat. No. 7,825,903.

(51) Int. Cl.
*G06F 3/041* (2006.01)

(52) U.S. Cl.
USPC ........................................ 345/173; 178/18.04

(58) Field of Classification Search
USPC .......................................... 345/173; 341/32
See application file for complete search history.

(56) References Cited

U.S. PATENT DOCUMENTS

| 3,490,059 | A | 1/1970 | Paulsen et al. |
| 3,623,046 | A | 11/1971 | Scourtes |
| 3,781,114 | A | 12/1973 | Marsh et al. |
| 3,911,416 | A | 10/1975 | Feder |
| 3,944,798 | A | 3/1976 | Eaton |
| 4,023,290 | A | 5/1977 | Josephson |
| 4,101,884 | A | 7/1978 | Benton, Jr. |

(Continued)

FOREIGN PATENT DOCUMENTS

| DE | 19613025 A1 | 3/1996 |
| EP | 0358989 A2 | 3/1990 |

(Continued)

OTHER PUBLICATIONS

Akamatsu, M., et al., "Multi-Modal Mouse: A Mouse type device with tactile and force display," Presence, vol. 3, No. 1, (1994), pp. 73-80.

(Continued)

*Primary Examiner* — Chanh Nguyen
*Assistant Examiner* — Long D Pham
(74) *Attorney, Agent, or Firm* — Pillsbury Winthrop Shaw Pittman LLP (57) ABSTRACT

A touch panel assembly includes a touch-sensitive panel oriented along a plane. An actuator includes a frame having a first portion and a second portion at least partially oriented parallel to the plane. The first portion and the second portion are coupled together with a biasing element. A first magnetic device is coupled to the first portion. A second magnetic device is coupled to the second portion and positioned adjacent to the first magnetic device. The first magnetic device configured to move the first portion in a first direction parallel to the plane when energized by a current to cause a haptic effect to be felt on the touch sensitive panel. The biasing element applies a biasing force which causes the first portion to move in a second direction opposite to the first direction.

18 Claims, 9 Drawing Sheets

U.S. PATENT DOCUMENTS

| | | |
|---|---|---|
| 4,103,155 A | 7/1978 | Clark |
| 4,108,164 A | 8/1978 | Hall, Sr. |
| 4,127,752 A | 11/1978 | Lowthorp |
| 4,237,439 A | 12/1980 | Nemoto |
| 4,242,823 A | 1/1981 | Bruno |
| 4,262,240 A | 4/1981 | Arai |
| 4,262,549 A | 4/1981 | Schwellenbach |
| 4,355,293 A | 10/1982 | Driscoll |
| 4,374,384 A | 2/1983 | Moates |
| 4,382,217 A | 5/1983 | Horner et al. |
| 4,385,836 A | 5/1983 | Schmitt |
| 4,414,537 A | 11/1983 | Grimes |
| 4,414,984 A | 11/1983 | Zarudiansky |
| 4,422,060 A | 12/1983 | Matsumoto et al. |
| 4,448,083 A | 5/1984 | Hayashi |
| 4,461,085 A | 7/1984 | Dewar et al. |
| 4,542,291 A | 9/1985 | Zimmerman |
| 4,550,221 A | 10/1985 | Mabusth |
| 4,550,617 A | 11/1985 | Fraignier et al. |
| 4,553,080 A | 11/1985 | Cannon et al. |
| 4,557,275 A | 12/1985 | Dempsey, Jr. |
| 4,560,983 A | 12/1985 | Williams |
| 4,581,491 A | 4/1986 | Boothroyd |
| 4,584,625 A | 4/1986 | Kellogg |
| 4,601,206 A | 7/1986 | Watson |
| 4,639,884 A | 1/1987 | Sagues |
| 4,653,011 A | 3/1987 | Iwano |
| 4,676,002 A | 6/1987 | Slocum |
| 4,678,908 A | 7/1987 | LePlante |
| 4,680,466 A | 7/1987 | Kuwahara et al. |
| 4,692,756 A | 9/1987 | Clark |
| 4,704,909 A | 11/1987 | Grahn et al. |
| 4,715,235 A | 12/1987 | Fukui et al. |
| 4,731,603 A | 3/1988 | MacRae et al. |
| 4,757,453 A | 7/1988 | Nasiff |
| 4,758,165 A | 7/1988 | Tieman et al. |
| 4,769,763 A | 9/1988 | Trieb et al. |
| 4,772,205 A | 9/1988 | Chlumsky et al. |
| 4,791,416 A | 12/1988 | Adler |
| 4,811,608 A | 3/1989 | Hilton |
| 4,821,030 A | 4/1989 | Batson et al. |
| 4,871,992 A | 10/1989 | Peterson |
| 4,885,565 A | 12/1989 | Embach |
| 4,891,764 A | 1/1990 | McIntosh |
| 4,897,582 A | 1/1990 | Otten et al. |
| 4,926,879 A | 5/1990 | Sevrain et al. |
| 4,933,584 A | 6/1990 | Harms et al. |
| 5,022,384 A | 6/1991 | Freels et al. |
| 5,027,648 A | 7/1991 | Filleau |
| 5,035,242 A | 7/1991 | Franklin et al. |
| 5,121,091 A | 6/1992 | Fujiyama |
| 5,143,505 A | 9/1992 | Burdea et al. |
| 5,159,159 A | 10/1992 | Asher |
| 5,165,897 A | 11/1992 | Johnson |
| 5,175,459 A | 12/1992 | Danial et al. |
| 5,184,310 A | 2/1993 | Takenouchi |
| 5,194,786 A | 3/1993 | Smith et al. |
| 5,212,473 A | 5/1993 | Louis |
| 5,223,658 A | 6/1993 | Suzuki |
| 5,237,327 A | 8/1993 | Saitoh et al. |
| 5,245,245 A | 9/1993 | Goldenberg |
| 5,262,777 A | 11/1993 | Low et al. |
| 5,316,017 A | 5/1994 | Edwards et al. |
| 5,321,762 A | 6/1994 | Stuart |
| 5,327,790 A | 7/1994 | Levin et al. |
| 5,334,893 A | 8/1994 | Oudet et al. |
| 5,355,148 A | 10/1994 | Anderson |
| 5,376,948 A | 12/1994 | Roberts |
| 5,434,549 A | 7/1995 | Hirabayashi et al. |
| 5,437,607 A | 8/1995 | Taylor |
| 5,440,183 A | 8/1995 | Denne |
| 5,452,615 A | 9/1995 | Hilton |
| 5,456,341 A | 10/1995 | Garnjost et al. |
| 5,477,237 A | 12/1995 | Parks |
| 5,489,812 A | 2/1996 | Furuhata et al. |
| 5,492,312 A | 2/1996 | Carlson |
| 5,521,336 A | 5/1996 | Buchanan et al. |
| 5,554,900 A | 9/1996 | Pop, Sr. |
| 5,562,707 A | 10/1996 | Prochazka et al. |
| 5,580,251 A | 12/1996 | Gilkes et al. |
| 5,638,060 A | 6/1997 | Kataoka et al. |
| 5,649,020 A | 7/1997 | McClurg et al. |
| 5,650,704 A | 7/1997 | Pratt et al. |
| 5,661,446 A | 8/1997 | Anderson et al. |
| 5,668,423 A | 9/1997 | You et al. |
| 5,670,755 A | 9/1997 | Kwon |
| 5,719,561 A | 2/1998 | Gonzales |
| 5,729,249 A | 3/1998 | Yasutake |
| 5,734,236 A | 3/1998 | Motegi |
| 5,749,533 A | 5/1998 | Daniels |
| 5,767,457 A | 6/1998 | Gerpheide et al. |
| 5,793,598 A | 8/1998 | Watanabe et al. |
| 5,808,381 A | 9/1998 | Aoyama et al. |
| 5,808,568 A | 9/1998 | Wu |
| 5,835,080 A | 11/1998 | Beeteson et al. |
| 5,847,528 A | 12/1998 | Hui et al. |
| 5,861,699 A | 1/1999 | Kopac |
| 5,887,995 A | 3/1999 | Holehan |
| 5,889,236 A | 3/1999 | Gillespie et al. |
| 5,894,263 A | 4/1999 | Shimakawa et al. |
| 5,896,076 A | 4/1999 | van Namen |
| 5,917,906 A | 6/1999 | Thornton |
| 5,930,741 A | 7/1999 | Kramer |
| 5,942,733 A | 8/1999 | Allen et al. |
| 5,943,044 A | 8/1999 | Martinelli et al. |
| 5,945,772 A | 8/1999 | Macnak et al. |
| 5,952,806 A | 9/1999 | Muramatsu |
| 5,977,867 A | 11/1999 | Blouin |
| 5,982,304 A | 11/1999 | Selker et al. |
| 5,986,643 A | 11/1999 | Harvill et al. |
| 5,988,902 A | 11/1999 | Holehan |
| 6,002,184 A | 12/1999 | Delson et al. |
| 6,008,800 A | 12/1999 | Pryor |
| 6,044,646 A | 4/2000 | Silverbrook |
| 6,057,753 A | 5/2000 | Myers |
| 6,061,004 A | 5/2000 | Rosenberg |
| 6,067,077 A | 5/2000 | Martin et al. |
| 6,067,081 A | 5/2000 | Hahlganss et al. |
| 6,072,475 A | 6/2000 | van Ketwich |
| 6,078,126 A | 6/2000 | Rollins et al. |
| 6,118,435 A | 9/2000 | Fujita et al. |
| 6,140,987 A | 10/2000 | Stein et al. |
| 6,147,422 A | 11/2000 | Delson et al. |
| 6,147,674 A | 11/2000 | Rosenberg et al. |
| 6,171,191 B1 | 1/2001 | Ogata et al. |
| 6,219,032 B1 | 4/2001 | Rosenberg et al. |
| 6,239,790 B1 | 5/2001 | Martinelli et al. |
| 6,243,080 B1 | 6/2001 | Molne |
| 6,256,011 B1 | 7/2001 | Culver |
| 6,262,717 B1 | 7/2001 | Donohue et al. |
| 6,268,671 B1 | 7/2001 | Furuki |
| 6,310,604 B1 | 10/2001 | Furusho et al. |
| 6,326,901 B1 | 12/2001 | Gonzales |
| 6,337,678 B1 | 1/2002 | Fish |
| 6,358,187 B1 | 3/2002 | Smith |
| 6,373,465 B2 | 4/2002 | Jolly et al. |
| 6,388,655 B1 | 5/2002 | Leung |
| 6,394,239 B1 | 5/2002 | Carlson |
| 6,404,107 B1 | 6/2002 | Lazarus et al. |
| 6,414,674 B1 | 7/2002 | Kamper et al. |
| 6,415,138 B2 | 7/2002 | Sirola et al. |
| 6,420,806 B2 | 7/2002 | Wittig |
| 6,429,846 B2 * | 8/2002 | Rosenberg et al. ........... 345/156 |
| 6,437,770 B1 | 8/2002 | Venema et al. |
| 6,445,284 B1 | 9/2002 | Cruz-Hernandez et al. |
| 6,456,024 B1 | 9/2002 | Schmider et al. |
| 6,469,695 B1 | 10/2002 | White |
| 6,473,069 B1 | 10/2002 | Gerpheide |
| 6,501,203 B2 | 12/2002 | Tryggvason |
| 6,509,892 B1 | 1/2003 | Cooper et al. |
| 6,518,958 B1 | 2/2003 | Mayajima et al. |
| 6,529,122 B1 | 3/2003 | Magnussen et al. |
| 6,535,201 B1 | 3/2003 | Cooper et al. |
| 6,587,091 B2 | 7/2003 | Serpa |
| 6,610,936 B2 | 8/2003 | Gillespie et al. |
| 6,628,195 B1 | 9/2003 | Coudon |
| 6,636,202 B2 | 10/2003 | Ishmael, Jr. et al. |

| | | |
|---|---|---|
| 6,639,581 B1 | 10/2003 | Moore et al. |
| 6,639,582 B1 | 10/2003 | Schrader |
| 6,647,145 B1 | 11/2003 | Gay |
| 6,654,003 B2 | 11/2003 | Boldy |
| 6,664,664 B2 | 12/2003 | Botos et al. |
| 6,686,901 B2 | 2/2004 | Rosenberg |
| 6,697,043 B1 | 2/2004 | Shahoian |
| 6,710,518 B2 | 3/2004 | Morton et al. |
| 6,822,635 B2 | 11/2004 | Shahoian et al. |
| 6,834,373 B2 | 12/2004 | Dieberger |
| 6,854,573 B2 | 2/2005 | Jolly et al. |
| 6,896,407 B2 | 5/2005 | Nomiyama et al. |
| 6,937,033 B2 | 8/2005 | Boronkay et al. |
| 7,009,595 B2 | 3/2006 | Roberts et al. |
| 7,113,177 B2 | 9/2006 | Franzen |
| 7,151,528 B2 | 12/2006 | Taylor et al. |
| 7,161,580 B2 | 1/2007 | Bailey et al. |
| 7,175,642 B2 | 2/2007 | Briggs et al. |
| 2002/0030663 A1 | 3/2002 | Tierling et al. |
| 2002/0033795 A1 | 3/2002 | Shahoian et al. |
| 2002/0149561 A1 | 10/2002 | Fukumoto et al. |
| 2002/0149570 A1 | 10/2002 | Knowles et al. |
| 2002/0159336 A1 | 10/2002 | Brown et al. |
| 2002/0185919 A1 | 12/2002 | Botos et al. |
| 2003/0016211 A1 | 1/2003 | Woolley |
| 2003/0030628 A1 | 2/2003 | Sato et al. |
| 2003/0058265 A1 | 3/2003 | Robinson et al. |
| 2003/0067449 A1 | 4/2003 | Yoshikawa et al. |
| 2003/0071795 A1 | 4/2003 | Baldauf et al. |
| 2003/0122779 A1 | 7/2003 | Martin et al. |
| 2003/0128191 A1 | 7/2003 | Strasser et al. |
| 2004/0178877 A1* | 9/2004 | Lin ............................ 336/234 |
| 2004/0183526 A1* | 9/2004 | Galbreath et al. ......... 324/207.2 |
| 2005/0001703 A1* | 1/2005 | Zimmerling ................. 335/220 |
| 2005/0007342 A1 | 1/2005 | Cruz-Hernandez et al. |
| 2005/0017947 A1 | 1/2005 | Shahoian et al. |
| 2005/0128186 A1 | 6/2005 | Shahoian et al. |
| 2005/0134417 A1* | 6/2005 | Maekawa et al. ............... 336/92 |
| 2006/0033703 A1 | 2/2006 | Olien et al. |
| 2006/0109254 A1* | 5/2006 | Akieda et al. ................. 345/173 |
| 2006/0109256 A1 | 5/2006 | Grant et al. |

FOREIGN PATENT DOCUMENTS

| | | |
|---|---|---|
| EP | 0541500 A1 | 5/1993 |
| EP | 0556999 | 8/1993 |
| EP | 0970714 A2 | 1/2000 |
| FR | 2851347 | 8/2004 |
| JP | 63-164127 | 10/1988 |
| JP | 5-20226 | 3/1993 |
| JP | 6-018341 | 1/1994 |
| JP | 6-139018 | 5/1994 |
| JP | 7-64723 | 3/1995 |
| JP | 2511577 | 7/1996 |
| JP | 11-85400 | 3/1999 |
| JP | 11-338629 | 12/1999 |
| JP | 1-350592 | 12/2001 |
| JP | 2-157087 | 5/2002 |
| JP | 2002-236543 | 8/2002 |
| JP | 2-259059 | 9/2002 |
| WO | WO 92/00559 A1 | 1/1992 |
| WO | WO 97/18546 | 5/1997 |
| WO | WO 02/12991 A1 | 2/2002 |
| WO | WO 02/27645 A1 | 4/2002 |
| WO | WO 02/31807 A1 | 4/2002 |
| WO | WO 03/081623 | 10/2003 |
| WO | WO 2006/042309 | 4/2006 |

OTHER PUBLICATIONS

Bhatti, P. et al, "Single-Chip Velocity Measurement System for Incremental Optical Encoders," Proceedings of the IEEE Transactions on Control Systems Technology. vol. 5 No. 6 (1997), 8 pages.

Bliss, James C., "Optical-to-tactile Image Conversion for the Blind," IEEE Transactions on Man-Machine Systems, vol. MMS-11, No. 1, 1970, pp. 58-65.

Bolanowski, S.J. et al., "Four Channels Mediate the Mechanical Aspects of Touch," J. Acoust. Soc. Am. 84 vol. 84 (5), Nov. 1988, pp. 1680-1694.

Brown, R.H. et al, "Analysis of Algorithms for Velocity Estimation and Discrete Position Versus Time Data," IEEE Transactions on Industrial Electronics, vol. 39, No. 1, Feb. 1992, pp. 11-19.

Brown, R.H., "Velocity Observations from Discrete Position Encoders," Proceedings of the IEEE Conference Industrial Electronics Society (1987), pp. 1111-1118.

Buttolo, P., "Hard Disk Actuators for Mini Teleoperation," Telemanipulator and Telepresence Technologies Symposium (1994) pp. 55-61.

Carreras, R. "Introducing a Revolutionary Moving Magnet Linear Motor," www.enduratec.com, 2003, 5 pages.

Eberhardt, Silvio P. et al., "Inducing Dynamic Haptic Perception by the Hand: System Description and Some Results," Proceedings of ASME Dynamic Systems and Control, vol. DSC-55-1, No. 1, 1994, pp. 345-351.

Eberhardt, Silvio P. et al., "OMAR—A Haptic Display for Speech Perception by Deaf and Deaf-Blind Individuals," IEEE 1993, pp. 195-201.

ESA (European Space Agency), "Automation and Robotics", Sep. 15, 2000, pp. 21-23.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Fukumoto, M., et al, " Active Click: Tactile Feedback for Touch Panels," ACM CHI2001 Extended Abstracts, Apr. 2001, pp. 121-122.

Goldstein, Moise H. et al., "Tactile Aids for the Profoundly Deaf Child," 77 J. Acoust. Soc. Am 77 (1), Jan. 1985, pp. 258-265.

Jackson, K. M., "Linearity of Radio-Frequency Transducers," Medical and Biological Engineering and Computer, Jul. 1977, pp. 446-449.

Jespersen, E. et al., "Joint Angle Position Sensor," Proceedings of the 40th Annual Conference on Engineering in Medicine and Biology, Sep. 1987, p. 104.

Johnson, David A., "Shape-Memory Alloy Tactical Feedback Actuator," Tini Allow Company, Inc., Aug. 1990, 2 pages, pp. i-33.

Kaczmarek, K. A. et al. "Tactile Displays," in: Virtual Environments and Advanced Interface Design, New York: Oxford University Press, 1995, pp. 349-414.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kashani, R., "Tuned Mass Dampers and Vibration Absorbers," www.deicon.com, Apr. 2004, pp. 1-5.

Meijer, G., "Concepts and Focus Point for Intelligent Sensor Systems," Sensors and Actuators A, No. 41-42, (1994), pp. 183-191.

Meyer, K. et al., "A Survey of Position Trackers". Presence, vol. 1, No. 2, (1992), pp. 173-200.

Peine, W.J., "Tactile Shape Displays for Small Scale Shape Feedback," http://www.hrl.harvard.edu/~peine/display.html, 1998, pp. 1-2.

Poupyrev, I., et al, "Tactile interfaces for small touch screens."Proceedings of the 16th annural ACM Symposium on User Interface Software and Technology. Nov. 2-5, 2003, Vancouver, Canada, (2003), p. 217-220.

Rabinowitz, W.M. et al., "Multidimensional Tactile Displays: Identification of Vibratory Intensity, Frequency, and Contactor Area," J. Acoust. Soc. Am. 82 (4), Oct. 1987, pp. 1243-1252.

Ramstein, Christophe, "Combining Haptic and Braille Technologies: Design Issues and Pilot Study," Assets '96, 2nd Annual ACM Conference on Assistive Technologies, ACM SIGRAPH, Apr. 1996, pp. 37-44.

Russo, M., et al., "Controlling Dissipative Magnetic Particle Brakes in Force Reflective Devices," DSC-vol. 42, Advances in Robotics, ASME 1992, (1992), pp. 63-70.

Saito, K. et al., "A Microprocessor-Controlled Speed Regulator with Instantaneous Speed Estimation for Motor Drives," Proceedings of the IEEE Transactions on Industrial Electronics, vol. 35, No. 1, Feb. 1988, pp. 95-99.

Shahinpoor, M., "A New Effect in Ionic Polymeric Gels : The Ionic Flexogelectric Effect," in: Proc. SPIE 1995 North American Conference on Smart Structures and Materials, Feb. 28-Mar. 2, 1995, San Diego, CA, vol. 2441, paper No. 05, (1995), pp. 42-53.

SMK Corp., "Force Feedback Touch Panel," SMK Corp, Product Specification Sheet, Oct. 2002, 1 page.

SMK Corp., "Force Feedback Type Optical Touch Panel Developed," SMK Corp, No. 631scs, Oct. 30, 2002, 2 pages.

SMK Corp., "Multi Functional Touch Panel, Force Feedback Type, Developed," SMK Corp, No. 628scs, Sep. 30, 2002, 2 pages.

Snyder, W.E. et al., "Using Optical Shaft Encoders," In The Beginning, Hayden Book Company, 1983, 18 pages.

Taylor, Mike, "Field-Effect Sensor Offers Sealed, Long Life Operation," Useful Technology for Your Idea File, Mar. 2004, www.designnews.com, 1 page.

Weiss, J., "Gallium Arsenide Strain-Optic Voltage Monitor," vol. 12 Sensors No. 10, Oct. 1995, pp. 37-40.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.

Wiker, Steven F., "Teletouch Display Development: Phase 1 Report," Naval Ocean Systems Center, Technical Report 1230, Jul. 1988, 66 pages.

International Search Report and Written Opinion in PCT Application No. PCT/US2006/018883, mailed Sep. 29, 2006.

* cited by examiner

METHOD AND APPARATUS FOR PROVIDING HAPTIC EFFECTS TO A TOUCH PANEL USING MAGNETIC DEVICES

CROSS-REFERENCE TO RELATED APPLICATIONS

The present application is a continuation of U.S. patent application Ser. No. 11/128,717 filed May 12, 2005, now U.S. Pat. No. 7,825,903, in the name of inventors George V. Anastas and Neil T. Olien and entitled "Method And Apparatus For Providing Haptic Effects To A Touch Panel" commonly owned herewith.

GOVERNMENT INTEREST

This invention was made with support under grant number DMI-0441692 from the National Science Foundation. The United States Government has certain rights in the invention.

TECHNICAL FIELD

The present invention relates to the field of computer interface systems. More particularly, the present invention relates to a user interface device that provides haptic effect in response to user inputs.

BACKGROUND

As computer-based systems, appliances, automated teller machines (ATM), point-of-sale terminals and the like become more prevalent, the ease of use of the human-machine interface is becoming more and more important. Such interfaces should operate intuitively and with little or no training so that they may be employed by virtually anyone. Many conventional user interface devices are available on the market and include the keyboard, the mouse, the joystick, the touch screen, and the touchpad. One of the most intuitive and interactive interface devices known is the touch panel, which is also known as a touch screen, a touch pad, a touch screen display, and so forth. A touch panel includes a touch-sensitive input panel and a display device, usually in a sandwich structure and provides a user with a machine interface through touching a panel sensitive to the user's touch and displaying content that the user "touches."

A touch panel can be a small planar rectangular pad, which can be installed in or near a computer, an automobile, ATM machines, and the like. A conventional touch-sensitive component of a touch panel employs various types of touch sensing technology such as capacitive sensing, pressure sensing and the like as known in the art to detect locations being pressed on the panel. For example, a user contacts the touch-sensitive panel commonly with a fingertip to emulate a button press and/or moves his or her finger on the panel according to the graphics displayed behind the panel on the display device.

A problem associated with conventional touch panels is that they lack the capability of providing interactive tactile acknowledgements to indicate whether input has been accepted or rejected.

Accordingly, there is a need for a touch panel to provide an interactive tactile feedback to indicate whether a user's selection has been accepted or rejected and/or other appropriate or desirable effects.

SUMMARY

In an aspect, a touch panel assembly includes a touch-sensitive panel oriented along a plane. An actuator includes a frame having a first portion and a second portion at least partially oriented parallel to the plane. The first portion and the second portion are coupled together with a biasing element. A first magnetic device is coupled to the first portion. A second magnetic device is coupled to the second portion and positioned adjacent to the first magnetic device. The first magnetic device configured to move the first portion in a first direction parallel to the plane when energized by a current to cause a haptic effect to be felt on the touch sensitive panel. The biasing element applies a biasing force which causes the first portion to move in a second direction opposite to the first direction.

In an aspect, a method for providing haptic effects in a touch panel assembly, the method comprises measuring a touching contact with a touch-sensitive panel, wherein the touch-sensitive panel is oriented along a plane; generating a first signal in response to the touching contact; transmitting the first signal to a processor; generating a haptic output current signal in response to said first signal, wherein the haptic output current signal is transmitted to an actuator having a first portion coupled to the touch-sensitive panel and a second portion arranged to adjacent to the first portion, wherein the first portion and the second portion are oriented parallel to the plane, the actuator having a first magnetic device coupled to the first portion and a second magnetic device coupled to the second portion, wherein the haptic output current signal causes the first magnetic device and first portion to move in a first direction parallel to the plane to cause a haptic effect to be felt at the touch-sensitive panel, the actuator including a biasing element coupled to the first and second portions configured to apply a biasing force which causes the first portion to move in a second direction opposite to the first direction. Additional features and benefits of the present invention will become apparent from the detailed description, figures and claims set forth below.

BRIEF DESCRIPTION OF THE DRAWINGS

The accompanying drawings, which are incorporated into and constitute as part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and apparatus for providing haptic effects to a touch panel. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present invention relates to a user interface system that, in one embodiment, includes a display, an actuator and a touch-sensitive panel. A housing, such as a case, carrier, base, frame or the like may also be used to house the display, actuator and touch-sensitive panel. The actuator includes at least a pair of magnetic devices and at least one biasing element arranged to counter the gap-closing attractive force of the magnetic devices for providing haptic effects.

Figure 1:
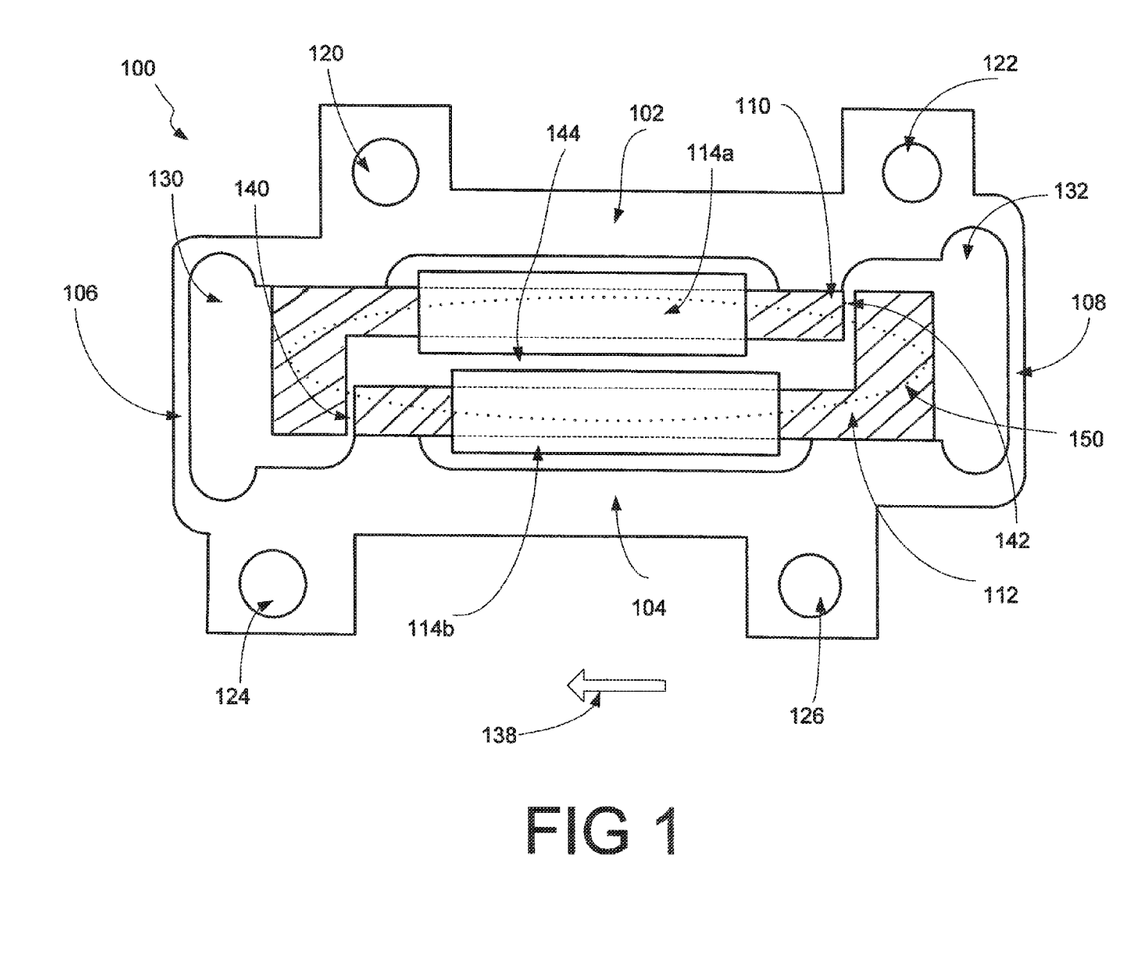
FIG. 1 is an elevational diagram illustrating an actuator for providing haptic effects in accordance with one embodiment of the present invention.

Turning now to the figures, FIG. 1 illustrates an actuator 100 for generating haptic effects in accordance with one embodiment of the present invention. Actuator 100 includes two L-shaped pole pieces 110, 112, first and second structural elements 102 and 104 and first and second biasing elements 106 and 108. Pole pieces 110, 112, may be made of standard magnetic steels with high permeability, or other suitable ferromagnetic materials such as soft magnetic materials with high magnetic permeability (e.g., iron, nickel, magnetic alloys) or sintered materials such as ferrite, as are well known to those of ordinary skill in the art. They need not be made of the same material and they are further coupled to coils 114a, 114b to form electromagnetic devices ("magnetic device"). Coils 114a, 114b, which may be made of copper or other suitable electric conductors, are coupled to one or more current sources for generating magnetic fields when current passes through the coils 114a, 114b. In another embodiment one of the pole pieces need not include a coil as long, as it is formed of a ferromagnetic material.

Actuator 100 further includes structural elements 102, 104 and first and second biasing elements 106, 108 to form a frame for the actuator 100. It should be noted that structural elements 102, 104 and biasing elements 106, 108 can be manufactured out of a single piece of material such as metal or plastic. Alternatively, structural elements 102, 104 and biasing elements 106, 108 may be manufactured independently. First structural element 102, as shown in FIG. 1, includes apperetures 120, 122, which are used for coupling or fastening to a housing, a display or a touch-sensitive panel. Similarly, structural element 104 also contains apperetures 124, 126 for similar coupling. Structural elements 102, 104 are made of reasonably rigid materials, such as plastic, aluminum, and the like, for providing physical support for the pole pieces 110, 112. Biasing elements 106, 108, which may be springs, flexure springs, flexible blades, flexible members, elastomeric components, foam components, and the like, are made of elastic or relatively flexible materials that can be compressed and/or stretched within a predefined range. In one embodiment the biasing elements 106, 108 and structural elements 102, 104 are made of a plastic material with the biasing elements formed to be made thinner (and hence more flexible) than the structural elements.

Referring again to FIG. 1, pole pieces 110 and 112 are coupled to structural elements 102 and 104, respectively. Pole piece 110 is placed adjacent to pole piece 112 with three magnetic gaps 140, 142 and 144 between the pole pieces 110, 112. The width of the gap 144 situated between the main bodies of the pole pieces 110, 112 is, in one embodiment, in a range of about 1 to about 5 millimeters ("mm"). The width of the gaps 140, 142 is in one embodiment, in a range of about 0.25 to about 0.75 mm. Air pockets 130, 132, which can be of any shape, provide space for pole pieces 110, 112 to move. They are not required, however. Because gaps 140, 142 are much smaller than gap 144 the attractive magnetic force at gaps 140, 142 dominates over any attractive force across gap 144.

In operation, the biasing elements 106, 108 provide minimal force if there is no current passing through the coils 114 and the actuator is (accordingly) in a relaxed state. Under this no power condition, the actuator attains a first equilibrium position as shown, for example, in FIG. 1. When power is applied to coil(s) 114a, 114b an input current passes through the coil(s) creating magnetic flux lines 150 in the pole pieces 110, 112 and across gaps 140, 142. This process acts to generate an attractive force or attractive magnetic force between the pole pieces 110, 112 when the coils are wound so that the electromagnetic effects do not cancel one another. The term attractive force and attractive magnetic force are used interchangeably herein. The attractive magnetic force acts against the biasing elements 106, 108 and pulls the pole pieces 110, 112 closer together at the gaps 140, 142. In accordance with the embodiment shown in FIG. 1, under the attractive magnetic force, with structural element 102 held fixed, the pole piece 112 moves in a direction from right to left (as indicated by arrow 138) toward the pole piece 110. Pole piece 110, in this embodiment, may be fastened or secured to structural element 102, which may be further secured to a housing, touch-sensitive panel or display device. When one of the pole pieces 110, 112 is displaced enough distance within the gaps 140, 142, a second equilibrium position is reached as increasing spring force is applied in an opposite direction by biasing elements 106, 108. When power is then reduced or removed, the biasing elements 106, 108 force the pole pieces 110, 112 back to their original no-power position, also known as the first equilibrium position as described earlier.

It should be noted that the attractive force can be manipulated by varying an amount of current passing through the coils 114a, 114b. Accordingly, the acts of varying the magnitude, duration and pulse repetition of current passing through the coils 114a, 114b can be used to vary the level and quality of sensation provided by the haptic effect. It should be further noted that the haptic effect, which is also known as tactile, force feedback or haptic sensation, can be a pulse, vibration, spatial texture, weight or other physical properties sensible through feeling and touch. The term haptic effect and haptic sensation will be used interchangeably herein.

The present invention allows a user to manipulate the frequency of the movements between the pole pieces 110, 112 by adjusting the periodicity of applied input current. The input current means a current passing through the coils 114a, 114b for generating magnetic fields and magnetic flux in the pole pieces 110, 112 and across the magnetic gaps 140, 142. It should be noted that input currents having different waveform shapes will produce different haptic effect; when an input current is in a square waveform, the haptic effect will be different than when the input current waveform has a sinusoidal shape. In one embodiment, the frequency of haptic effects may have a range between about 40 and about 300 Hertz (Hz).

An advantage of using such a magnetic circuit with an actuator 100 as described above is to efficiently generate force. Unlike other methods, a permanent magnet is not required to implement the present invention. One could be included to add a small magnetic bias to the magnetic circuit, however. Another advantage of actuator 100 is that it may be made very compact in size. For example, in one embodiment actuator 100 may be about 1.5 inches long, 0.6 inches high and 0.3 inches deep. Depending on the orientation of the actuator 100 with respect to a touch-sensitive panel, it can excite either in-plane or out-of-plane motion between the touch-sensitive panel and the display device for haptic sensation. It should be noted that the L-shaped pole pieces as illustrated in FIG. 1 represent merely one embodiment and other arrangements of the pole pieces may also be used although the L-shaped pole pieces are believed to be relatively space efficient for this application.

Figure 2:
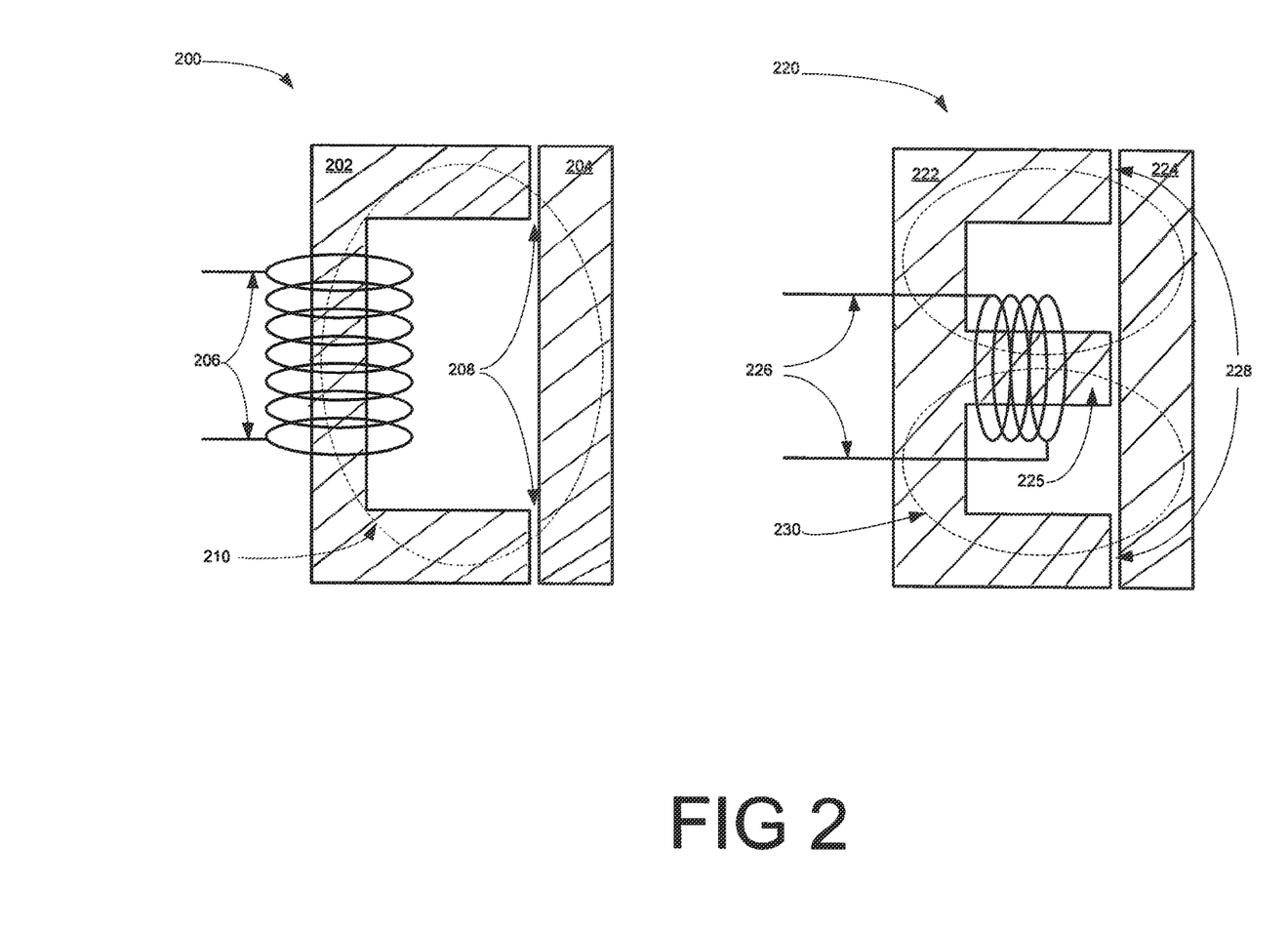
FIG. 2 is an elevational diagram illustrating alternative electromagnetic components for generating attractive magnetic force in an actuator in accordance with one embodiment of the present invention.

FIG. 2 illustrates two alternative embodiments of electromagnet components 200 and 220 capable of generating attractive magnetic force in accordance with the present invention. Electromagnet component 200 includes a C-shaped pole piece 202, an I-shaped pole piece 204, and a single coil 206. Pole pieces 202, 204 may be made of any suitable ferromagnetic materials as discussed above.

C-shaped pole piece 202 is placed adjacent to pole piece 204 with two gaps 208. The width of the gap 208 is approximately 0.5 mm. When the input current passes through the coils 206, a magnetic flux 210 is generated. Magnetic flux 210 generates the attractive magnetic force between the pole pieces 202, 204. The attractive magnetic force causes the pole piece 204 to move closer to the pole piece 202. Alternatively, the attractive magnetic force can cause pole piece 202 to move closer to pole piece 204 if pole piece 204 is relatively fixed. Haptic effects may be generated by the movements caused by the attractive magnetic force between the pole pieces 202, 204.

Electromagnet component 220 includes an E-shaped pole piece 222, an I-shaped pole piece 224, and a coil 226. Pole pieces 222, 224 may be constructed as discussed above. E-shaped pole piece 222 is placed adjacent to the I-shaped pole piece 224 with a gap 228. The width of the gap 228 is approximately 0.5 mm. When the input current passes through coils 226, magnetic flux lines 230 are generated. Magnetic flux lines 230 cause an attractive magnetic force between pole pieces 222, 224. The attractive magnetic force causes pole piece 224 to move closer to pole piece 222 and effectively narrow the width of the gap 228. In another embodiment, the attractive magnetic force causes the pole piece 222 to move closer to pole piece 224 if pole piece 224 is fastened to housing. A haptic effect may be generated by movements between the pole pieces.

Figure 3:
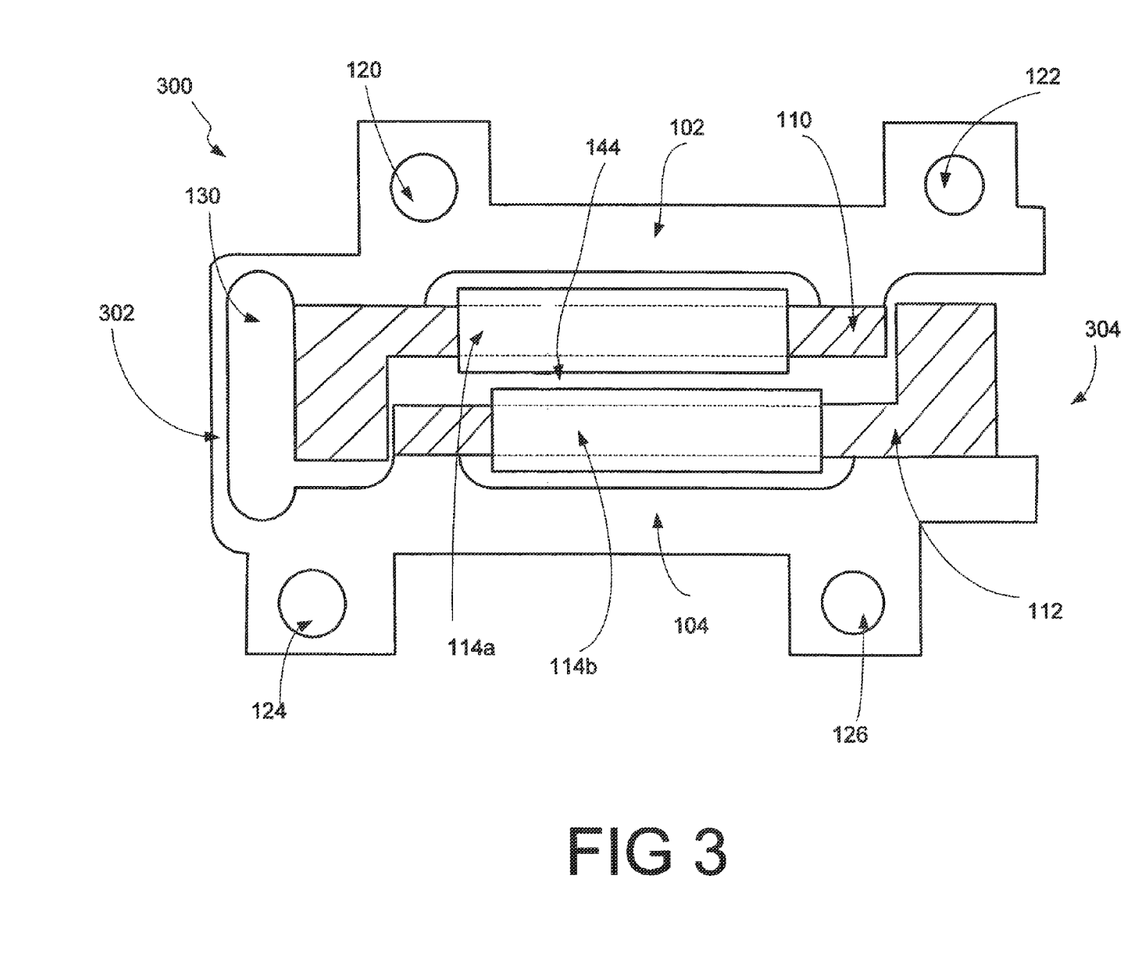
FIG. 3 is an elevational diagram of an alternative embodiment of an actuator in accordance with the present invention.

FIG. 3 is an actuator 300 illustrating an alternative embodiment of the actuator illustrated in FIG. 1 in accordance with one embodiment of the present invention. Actuator 300 includes two L-shaped pole pieces 110, 112, structural elements 102, 104, and biasing element 302. Pole pieces 110, 112 are further coupled to coils 114a, 114b to form magnetic devices. Coils 114a, 114b are coupled to one or more current sources for causing magnetic flux in pole pieces 110, 112.

Actuator 300 further includes structural elements 102, 104 and biasing element 302 to form a frame. It should be noted that structural elements 102, 104 and biasing element 302 can be manufactured at the same time and on a single frame. Alternatively, structural elements 102, 104 and biasing element 302 may be formed as separate structures that are then assembled together. Structural elements 102, 104 are fabricated or discussed above to provide physical support for the pole pieces 110, 112. Biasing element 302, which may be formed as described above, is made of an elastic material that may be compressed or stretched within a predefined range. Referring to FIG. 3, it should be noted that biasing element 302 may be located anywhere as long as it is coupled with structural elements 102, 104 and provides its biasing or spring function in opposition to the attractive gap-closing magnetic force of the magnetic devices.

Figure 4:
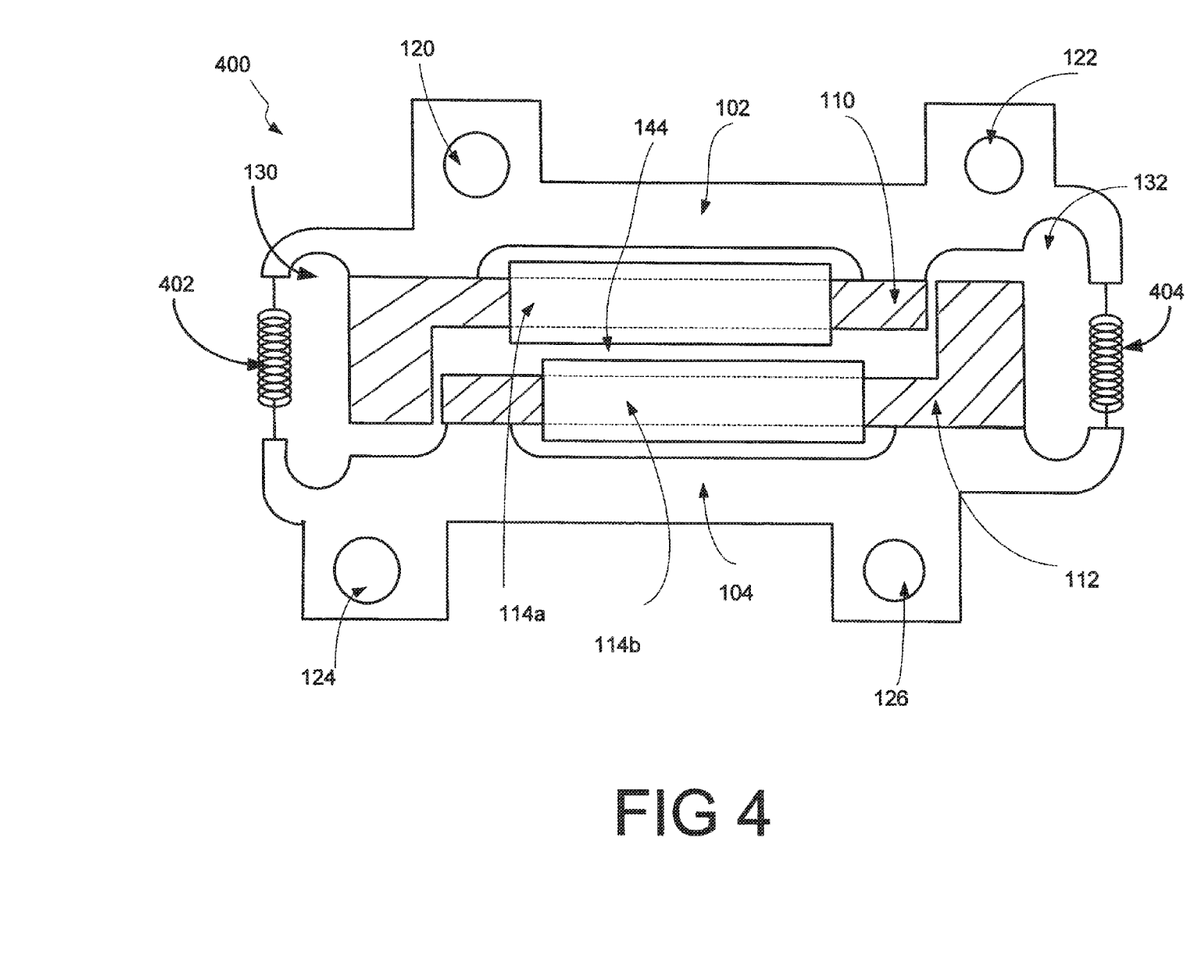
FIG. 4 is an elevational diagram of another embodiment of an actuator in accordance with the present invention.

FIG. 4 is an alternative embodiment of an actuator 400 in accordance with one embodiment of the present invention. Actuator 400 includes two L-shaped pole pieces 110, 112, structural elements 102, 104, and biasing elements 402, 404. Pole pieces 110, 112 are further coupled to coils 114a, 114b to form magnetic devices. Coils 114a, 114b are coupled to one or more current sources for creating magnetic flux in pole pieces 110, 112.

Actuator 400 further includes structural elements 102, 104 and biasing elements 402, 404 to form a frame that allows some movements between the structural elements 102, 104. It should be noted that structural elements 102, 104 and biasing elements 402, 404 are manufactured separately and they need to be assembled to form a frame. Structural elements 102, 104 are made of rigid materials, such as plastic, steel, aluminum, and so forth, to provide physical support for the pole pieces 110, 112. Biasing elements 402, 404 may be implemented as discussed above and may be made of elastic materials that can be compressed or stretched within a predefined range. Referring to FIG. 4, it should be noted that any type of biasing element may be used as long as it facilitates movement between the pole pieces 110, 112 and may be arranged to counter the attractive gap-closing force of the magnetic devices.

Figure 5:
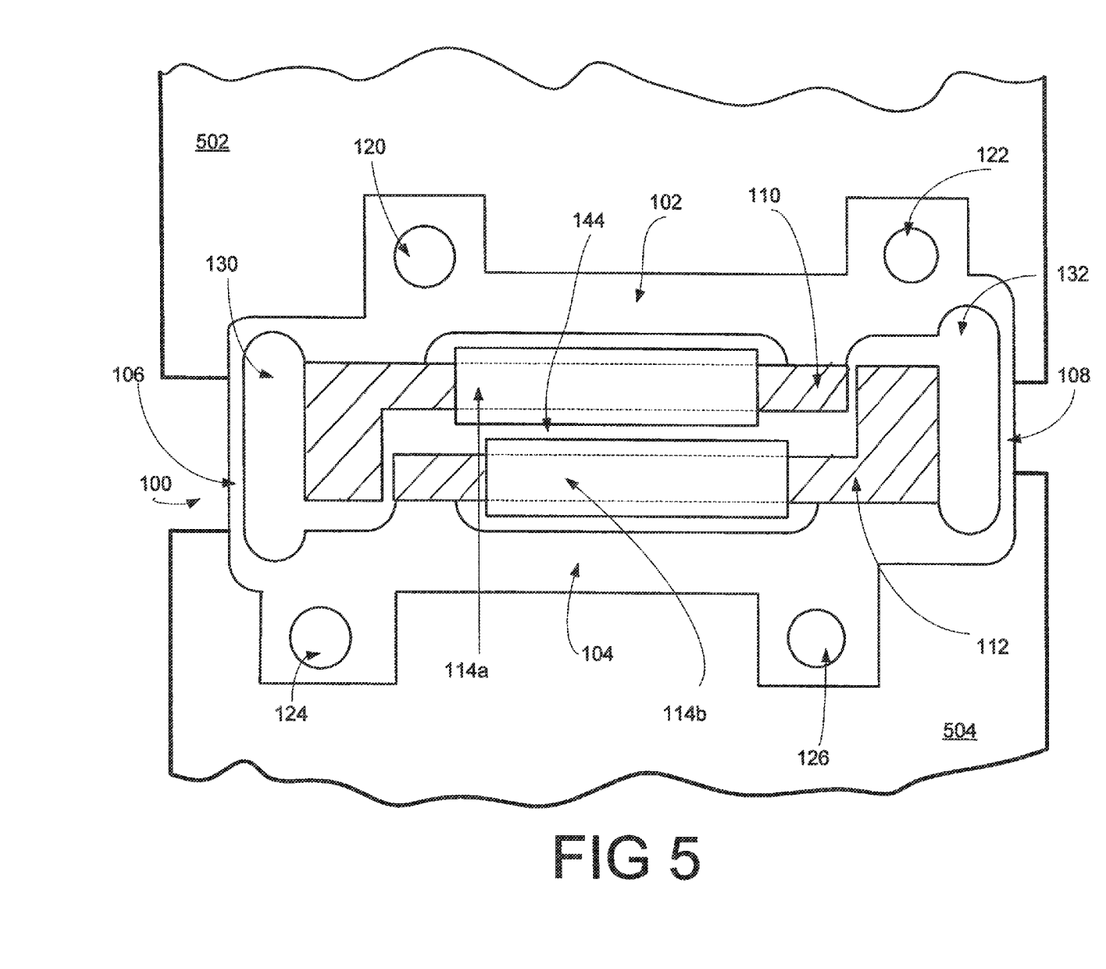
FIG. 5 is an elevational diagram of a system employing an actuator in accordance with one embodiment of the present invention.

FIG. 5 illustrates a system having an actuator 100 in accordance with one embodiment of the present invention. The system includes a case 502, a touch-sensitive panel 504, and an actuator 100. Actuator 100 includes two L-shaped pole pieces 110, 112, structural elements 102, 104, and biasing elements 106, 108. Pole pieces 110, 112 are further coupled to coils 114a, 114b to form magnetic devices. Coils 114a, 114b are coupled to one or more current sources for creating magnetic flux in pole pieces 110, 112. Biasing elements 106, 108 may be implemented as discussed above and may be made of elastic materials that may be compressed or stretched within a predefined range.

Referring to FIG. 5, one side of actuator 100 is coupled to the case 502 while another side of actuator 100 is coupled to the touch-sensitive panel 504. Structural element 102, as shown in FIG. 5, is fastened to the case 502. In this embodiment, the case 502 is rigid and does not move easily. In one embodiment, appertures 120, 122 may be used by fasteners to couple the structural element 102 to the case 502. Structural element 104 is, in turn fastened to a touch-sensitive panel 504. Touch-sensitive panel 504, in one embodiment, may be made of relatively flexible transparent materials. In one embodiment, holes 124, 126 may be used to fasten the structural element 104 to the touch-sensitive panel 504.

Figure 6:
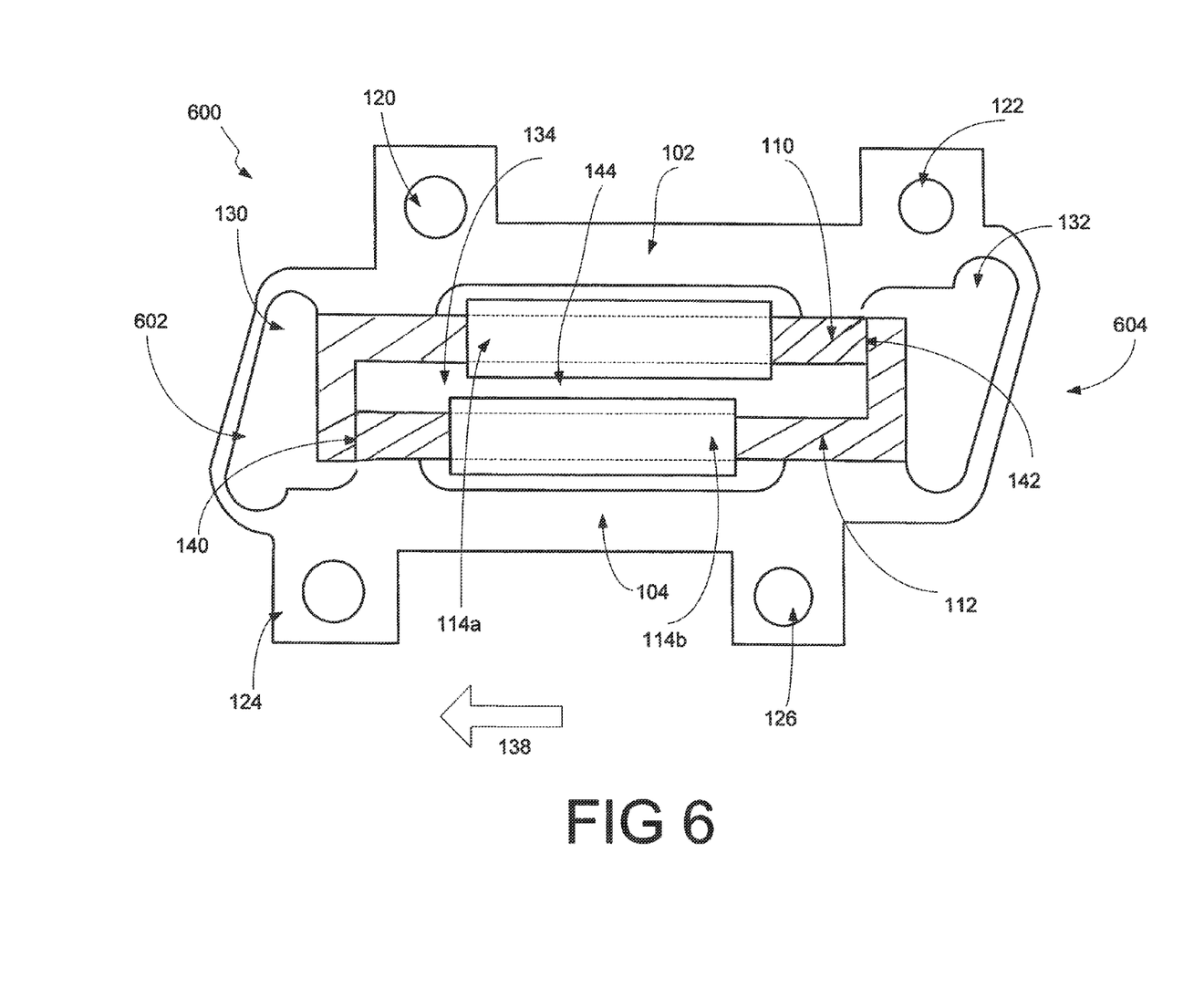
FIG. 6 is an elevational diagram illustrating a second equilibrium position of an actuator in accordance with one embodiment of the present invention.

When power is applied and input current begins to pass through the coils 114a, 114b, the attractive gap-closing force between pole pieces 110 and 112 starts to increase. The attractive force causes the pole piece 112 to be attracted to the pole piece 110 where pole piece 110 is held fixed. Pole piece 112 begins to move toward the pole piece 110 to close the gaps 140, 142 until it reaches a second equilibrium position as illustrated in FIG. 6. When power is reduced or removed, the attractive force between pole pieces 110 and 112 begins to reduce and consequently, the pole piece 112 begins to move back to its original position in response to the return force provided by the biasing elements 106, 108. The biasing elements 106, 108 continue to force the pole piece 112 to move back until it reaches the first equilibrium position as shown in FIG. 1. The movements between the pole pieces 110, 112 cause similar movements between the structural elements 102, 104. In one embodiment, the movements between the structural elements 102, 104 generate haptic effects or haptic sensation. Since touch-sensitive panel 504 is fastened to structural element 104, haptic effects on the touch-sensitive panel 504 occur when the movement between the structural elements 102, 104 occurs. Depending on the orientation of the actuator 100 with respect to the touch-sensitive panel 504, haptic effects may excite either in-plane or out-of-plane motion with respect to the touch-sensitive panel 504.

FIG. 6 illustrates, in a somewhat exaggerated manner to improve visibility, a second equilibrium position of an actuator 600 in accordance with one embodiment of the present invention. Actuator 600, which is similar to actuator 100, includes two L-shaped pole pieces 110, 112, structural elements 102, 104, and biasing elements 602, 604. Pole pieces 110, 112 are further coupled to coils 114a, 114b to form magnetic devices. Coils 114a, 114b are coupled to one or more current sources for generating magnetic flux in pole pieces 110, 112.

When power is off, the biasing elements 602, 604 provide minimal force to keep the actuator 600 in the first equilibrium position as described and shown in FIG. 1. When power is on, the input current passes through the coils 114 and generates magnetic flux in the pole pieces 110, 112. Magnetic flux causes an attractive magnetic force between the pole pieces 110, 112 across gaps 140, 142. The attractive magnetic force acts against the biasing elements 602, 604 and pulls the pole pieces 110, 112 closer together at the gaps 140, 142. Pole piece 110, in this embodiment, may be secured to a case via the structural element 102, while pole piece 112 is secured to a touch-sensitive panel via the structural element 104. The attractive magnetic force causes the pole piece 112 to move from right to left (as indicated by 138) toward the pole piece 110. When the pole piece 110 is displaced enough distance, a second equilibrium position is reached as shown in FIG. 6. When power is reduced or removed, the biasing elements 602, 604 force the pole piece 112 back to the first equilibrium position as discussed earlier.

Figure 7:
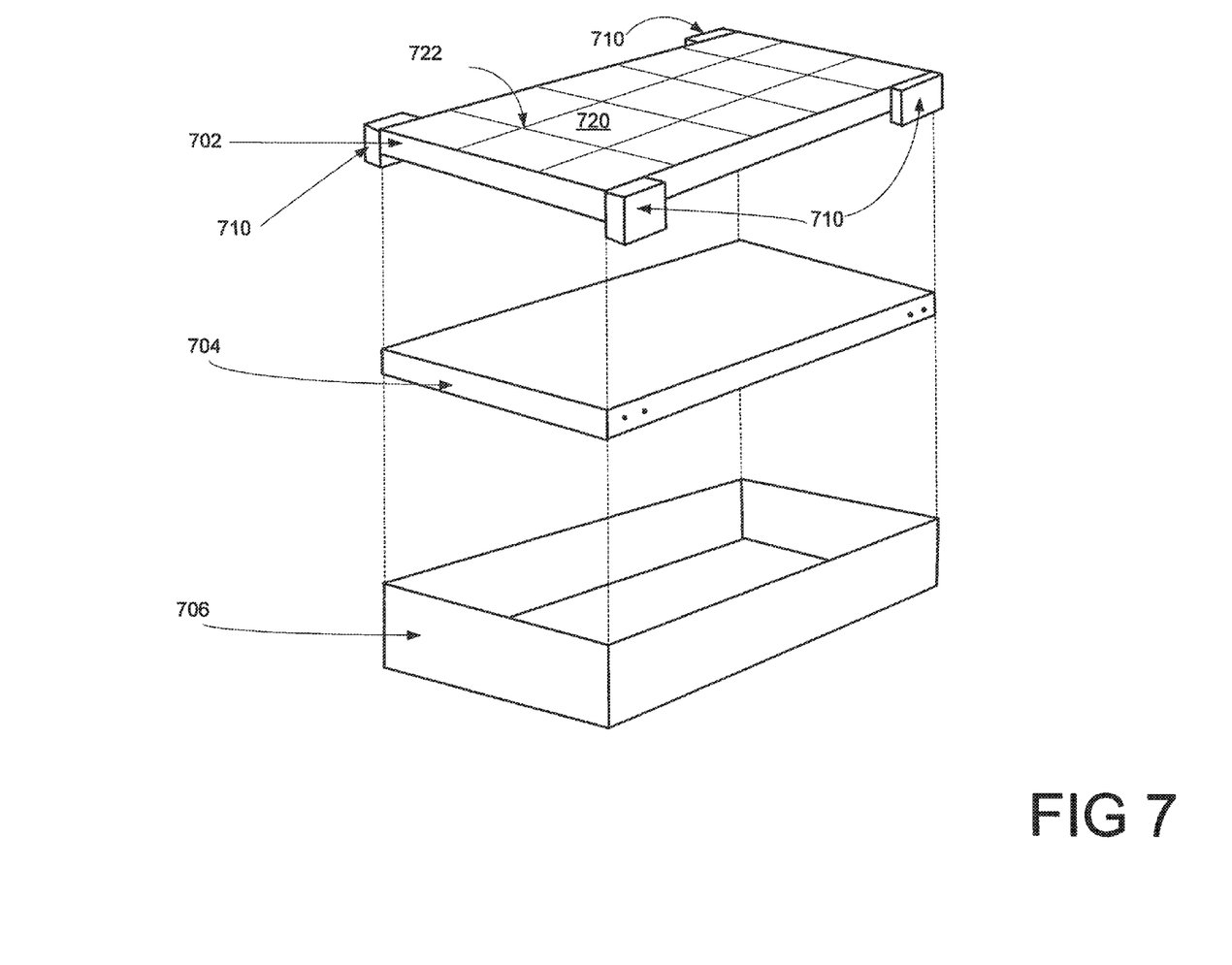
FIG. 7 is a front respective diagram of a system configured with a plurality of actuators in accordance with one embodiment of the present invention.

FIG. 7 illustrates a system configuration having an actuator in accordance with one embodiment of the present invention. The system configuration includes a touch-sensitive panel 702, a display panel 704, and a case 706. Touch-sensitive panel 702, in one embodiment, is made of substantially transparent materials, and is capable of transmitting light so that objects or images displayed in the display 704 may be seen through the touch-sensitive panel 702. The display 704 can be any type of display such as a cathode ray tube (CRT), liquid crystal display (LCD), plasma display, flat panel display or the like or could even be a static illustration. Both touch-sensitive panel 702 and display 704 may be installed in the case 706. In an alternative embodiment, the touch-sensitive panel 702 and the display 704 may be located separately with the actuator mounted between the touch-sensitive panel 702 and a relatively fixed location so that haptic effects are provided to the touch-sensitive panel but the display is located elsewhere.

In one embodiment, touch-sensitive panel 702 is further divided into various regions 720 and the regions are further separated by borders 722. Touch-sensitive panel 702 accepts a user's selection when only a region 720 is touched. Conversely, touch-sensitive panel 702 rejects a user's selection when a border 722 is touched. Touch-sensitive panel 702 further includes four actuators 710 and, depending on their orientation, actuators 710 can excite either in-plane or out-of-plane motion with respect to the touch-sensitive panel 702 for haptic sensation. Actuators 710 may be installed to move touch-sensitive panel for relative to display 704.

Figure 8:
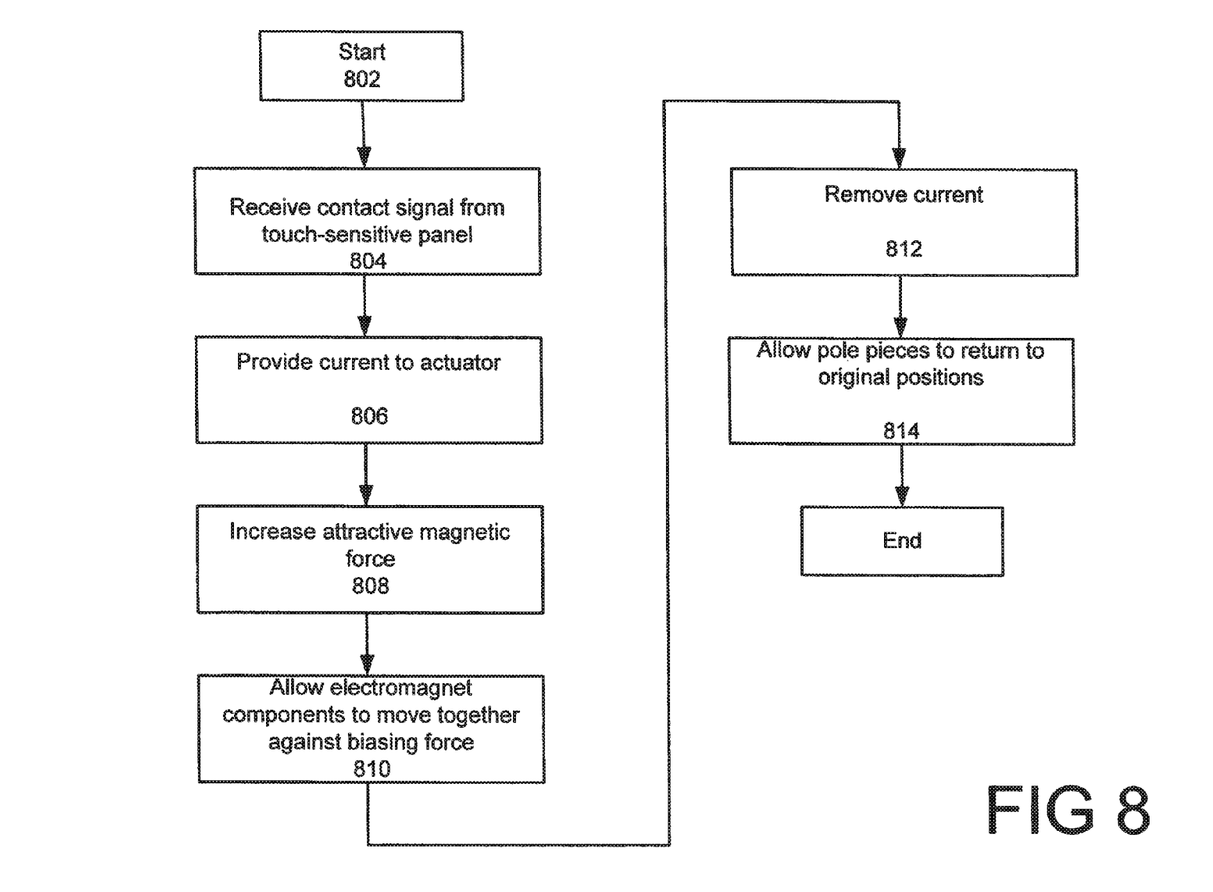
FIG. 8 is a flow diagram illustrating a method for generating haptic effects in accordance with one embodiment of the present invention.

FIG. 8 is a flow diagram illustrating a method for generating a haptic effect in accordance with one embodiment of the present invention. A process for generating haptic sensation starts at block 802. In one embodiment, the process can be activated by a user who touches a touch-sensitive panel possibly in a predetermined location or locations. In another embodiment, the process is activated by a touch signal or contact signal sent by the touch-sensitive panel, which indicates that a selection has been made by a user.

At block 804, the process receives a contact signal from the touch-sensitive, which may be sent by a touch-sensitive panel according to a selection made by a user. In another embodiment, a computer or controller sends a contact signal. Upon receipt of the contact signal, the process moves to the next block 806.

At block 806, the process instructs a controller to provide an input current according to the contact signal. In one embodiment, the input current is passing through at least one electromagnet device of an actuator to generate magnetic flux in a pair of pole pieces.

At block 808, the magnetic flux creates attractive magnetic force between the electromagnet devices which opposes a biasing force imparted by biasing elements arranged to counter the attractive magnetic force. The attractive magnetic force causes the pole pieces of the electromagnet devices to attract to each other. The process moves to the next block.

At block 810, the attractive magnetic force creates a movement between the electromagnet devices. In one embodiment, one pole piece of one electromagnet device is physically moved closer to another pole piece of another electromagnet device. At block 812, the current is removed. At block 814, a biasing element provides a bias force or return force to control the movement between the electromagnet devices within a predefined range. When the power is reduced or turned off in block 812, the pole pieces of electromagnet devices move back to their original positions.

With turning on and off the power continuously, a continuous movement between the electromagnet devices is created. Accordingly, the haptic effect is generated in response to the movement between the electromagnet devices. It should be noted that the frequency and amplitude of the movements between the electromagnet devices can be controlled by controlling the input current.

Figure 9:
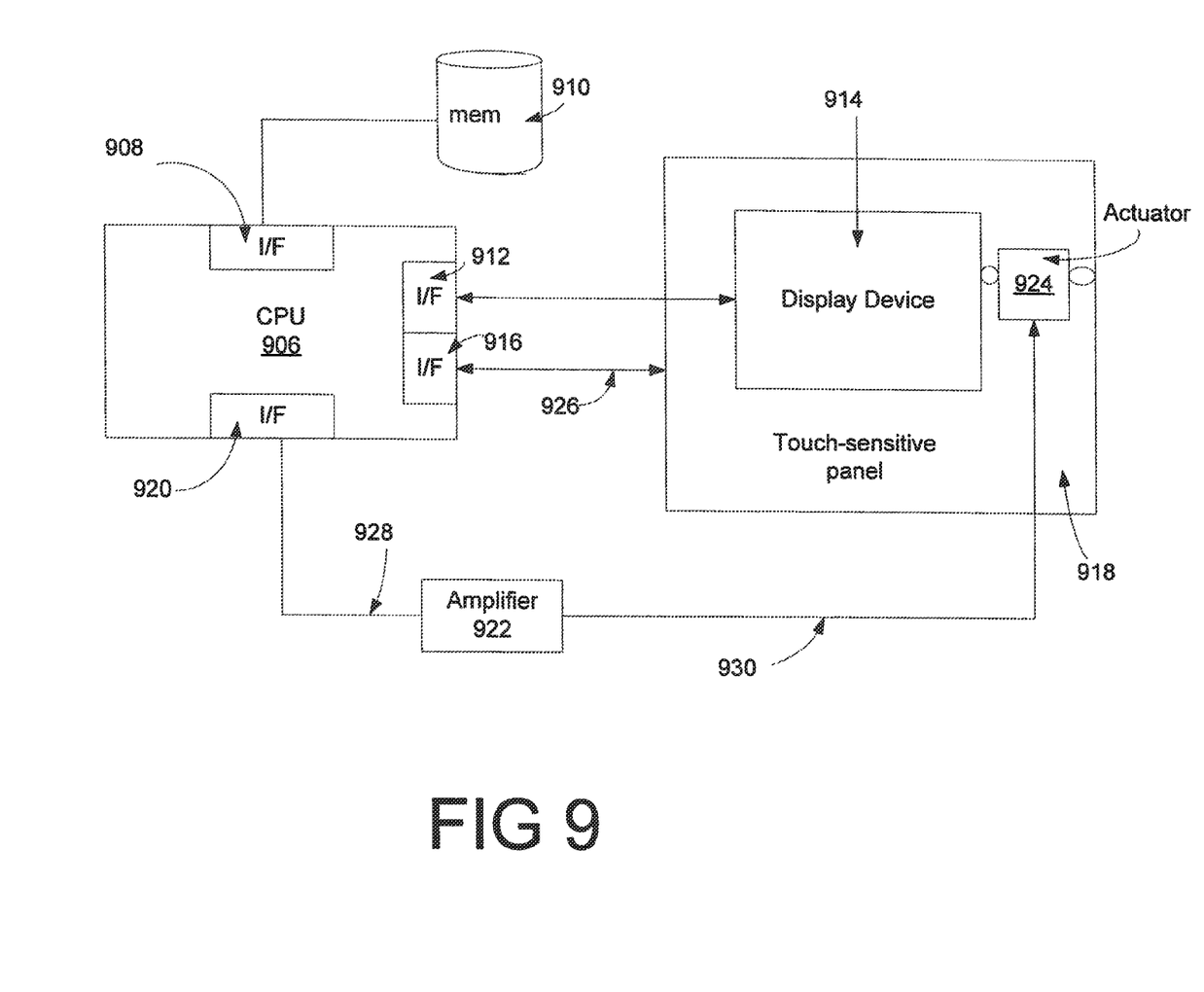
FIG. 9 is a block diagram illustrating a system having an actuator in accordance with one embodiment of the present invention.

FIG. 9 is a block diagram illustrating a system having an actuator in accordance with one embodiment of the present invention. The system includes a computer or central processing unit (CPU) 906 with appropriate interfaces 908 to a memory 910 for storing program steps for controlling the processor 906, 912 for controlling a display device 914, 916 for communicating with a touch-sensitive panel 918 and 920 for driving an amplifier circuit (if required) which in turn drives actuator 924. Actuator 924 is arranged to create relative movement between display device 914 and touch-sensitive panel 918. The relative movement may be in the plane of the touch-sensitive panel, out of the plane of the touch-sensitive panel, or same combination of the two. When the touch panel 904 is touched or depressed, it sends a contact signal to computer 906 via connection 926. The contact signal indicates that the touch panel has been selected or touched. Computer 906, which can be any general purpose computer operating under the control of suitable software and for firmware, is coupled to amplifier 922 via connection 928 and instructs amplifier 922 to provide input current to the actuator 924 over connection 930. Upon receipt of an instruction from the computer 906, amplifier 922 provides an input current to the actuator 924 via connection 930. Actuator 924 provides a haptic sensation or effect to the touch-sensitive panel 918. The processor 906 (or, potentially, another device (not shown) provides a display image or image to display device 914.

In the foregoing specification the invention has been described with reference to specific exemplary embodiments thereof. It will, however, be evident that various modifications and changes may be made thereto without departing from the broader scope of the invention. For example, if desired, two or more actuators could be attached together to provide multiple inputs to generate haptic effects and/or to increase the haptic effect and/or a component to be haptically effected could be arranged so that actuators are arranged to be able to pull it in more than one direction. Accordingly, the specification and drawings are to be regarded in an illustrative rather than restrictive sense.

What is claimed is:

1. A touch panel assembly, comprising:
    a touch-sensitive panel comprising a length and a width and a thickness, each of the length and the width being greater than the thickness, the touch-sensitive panel having a plane defined by the length and the width of the touch-sensitive panel; and
    an actuator including:
        a frame having a first structural element and a second structural element at least partially oriented parallel to the plane, wherein the first structural element and the second structural element are coupled together with a biasing element;
        a first magnetic device coupled to the first structural element;
        a second magnetic device coupled to the second structural element and positioned adjacent to the first magnetic device, the first magnetic device configured to move the first structural element in a first direction parallel to the plane when energized by a current to cause a haptic effect to be felt on the touch-sensitive panel, wherein the biasing element applies a biasing force which causes the first structural element to move in a second direction opposite to the first direction.

2. The touch panel assembly of claim 1, wherein the biasing element is a first biasing element.

3. The touch panel assembly of claim 2, wherein the first biasing element is arranged to provide a biasing force opposing an attractive magnetic force urging the first and second magnetic devices together to cause the haptic effect.

4. The touch panel assembly of claim 2, further comprising a second biasing element, wherein the second biasing element is arranged to provide a biasing force opposing an attractive magnetic force urging the first and second magnetic devices together when the current is applied.

5. The touch panel assembly of claim 2, wherein the first biasing element comprises a spring.

6. The touch panel assembly of claim 2, wherein the first biasing element comprises an elastomeric element.

7. The touch panel assembly of claim 2, wherein the first biasing element comprises a foam material.

8. The touch panel assembly of claim 2, wherein the first and second structural elements and the first biasing element are all formed from the same material and the first biasing element is thinner than the first and second structural elements and is configured to flex when perturbed.

9. The touch panel assembly of claim 1, wherein the first magnetic device includes a first pole piece and wherein the second magnetic device includes a second pole piece and further comprising a first coil disposed about at least one of said first pole piece and said second pole piece.

10. The touch panel assembly of claim 9, wherein the first pole piece and the second pole piece are L-shaped.

11. The touch panel assembly of claim 9, wherein the first pole piece is C-shaped and the second pole piece is I-shaped.

12. The touch panel assembly of claim 9, wherein the first pole piece is E-shaped and the second pole piece is I-shaped.

13. The touch panel assembly of claim 9, further comprising a second coil disposed about at least one of said first pole piece and said second pole piece.

14. The touch panel assembly of claim 13, further comprising a current source coupled to the first coil and the second coil.

15. The touch panel assembly of claim 14, wherein the current source comprises an amplifier.

16. The touch panel assembly of claim 9, further comprising a current source coupled to the first coil.

17. A method for providing haptic effects in a touch panel assembly, the method comprising:
    measuring a touching contact with a touch-sensitive panel, wherein the touch-sensitive panel comprises a length and a width and a thickness, each of the length and the width being greater that the thickness, and having a plane defined by the length and width of the touch-sensitive panel;
    generating a first signal in response to the touching contact;
    transmitting the first signal to a processor;
    generating a haptic output current signal in response to said first signal, wherein the haptic output current signal is transmitted to an actuator having a first structural element coupled to the touch-sensitive panel and a second structural element arranged to adjacent to the first structural element, wherein the first structural element and the second structural element are oriented parallel to the plane, the actuator having a first magnetic device coupled to the first structural element and a second magnetic device coupled to the second structural element, wherein the haptic output current signal causes the first magnetic device and the first structural element to move in a first direction parallel to the plane to cause a haptic effect to be felt at the touch-sensitive panel, the actuator including a biasing element coupled to the first and second structural elements configured to apply a biasing force which causes the first structural element to move in a second direction opposite to the first direction.

18. The method of claim 17, further comprising applying a current to the first magnetic device to generate an attractive magnetic force urging the first and second magnetic devices together, the first biasing element providing a biasing force opposing the attractive magnetic force.

\* \* \* \* \*